Nov. 16, 1965  W. W. McMULLEN  3,217,911
COMBINATION PALLET AND LIFTING DEVICE
Filed July 9, 1962  2 Sheets-Sheet 1

INVENTOR.
WAYNE W. McMULLEN
BY
ATTORNEYS

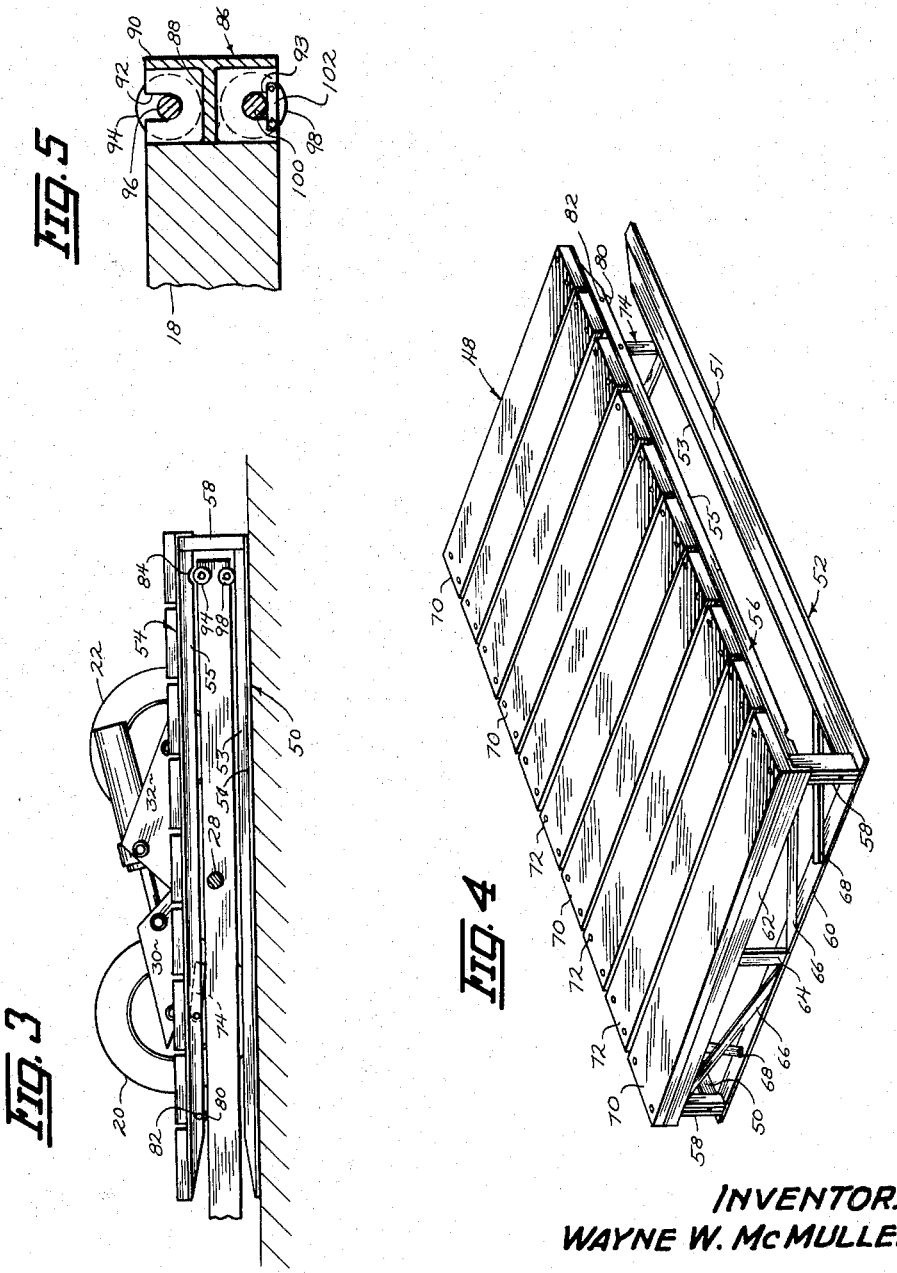

United States Patent Office 3,217,911
Patented Nov. 16, 1965

3,217,911
COMBINATION PALLET AND LIFTING DEVICE
Wayne W. McMullen, 1002 67th St., Des Moines, Iowa
Filed July 9, 1962, Ser. No. 208,401
7 Claims. (Cl. 214—512)

The loading and unloading of trucks and trailers has been facilitated by advances in the art which permit the load supporting surface of the vehicle to be lowered to the ground level for loading and unloading purposes. However, the problem still remains of carrying the cargo to and from the lowered supporting surface of the vehicle involved. Some merchandise is loaded on pallets and is deposited on and removed from the lowered vehicle by means of special lifting equipment.

Therefore, a principal object of my invention is to provide a combination pallet and lifting device which will permit the load involved to be placed in carrying engagement with the vehicle involved without the use of auxiliary lifting equipment.

A still further object of my invention is to provide a combination pallet and lifting device which will permit the load involved to be separated from the vehicle involved without the use of auxiliary equipment.

A still further object of my invention is to provide a pallet device that is self supporting when not mounted on a load carrying vehicle.

A still further object of my invention is to provide a combination pallet and lifting device that will not become disengaged with the load carrying vehicle while being supported thereon.

A still further object of my invention is to provide a combination pallet and lifting device wherein the pallet is well balanced in a lateral direction as it is supported on a load supporting vehicle.

A still further object of my invention is to provide a combination pallet and lifting device wherein no manual activity is required to load the pallet on the lifting means, or to deposit the same therefrom.

A still further object of my invention is to provide a pallet device that can be easily mounted on a lifting device.

Still further objects of my invention are to provide a combination pallet and lifting device that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIGURE 3 is a partial elevational view of my device when the pallet is in complete engagement with the vehicle in FIGURE 1 but in a lowered condition;

FIGURE 4 is a perspective view of my pallet device; and

FIGURE 5 is a partial sectional view through the rearward portion of my pallet device showing the construction thereof.

Figure 1:
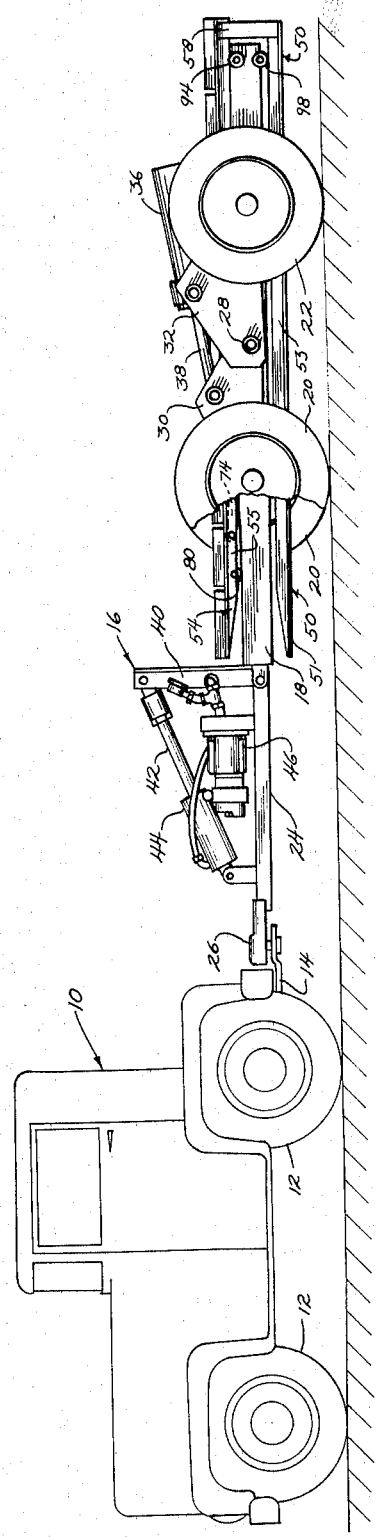
FIGURE 1 is a side elevational view of my pallet mounted on a vehicle capable of raising or lowering the load supporting surface.

I have used the numeral 10 to generally designate a self propelled prime mover with wheels 12 and drawbar 14. A trailer 16 with a load supporting deck 18, wheels 20 and 22, and pivotally mounted tongue 24, is connected to drawbar 14 by hitch element 26 on tongue 24. The trailer 16 is of the general type disclosed in my co-pending application Serial No. 155,279, filed November 28, 1961, wherein the deck 18 can be selectively raised and lowered with respect to the ground surface. The precise details of the raising and lowering mechanism will not be discussed fully here because these details do not constitute the invention here involved. Stud axles 28 extend outwardly from substantially the center side portions of deck 18. Pairs of brackets 30 and 32 are rotatably secured by one of their respective ends to each of the axles 28 and wheels 20 and 22 are rotatably secured to the other ends thereof. Hydraulic cylinders 36 are each pivotally secured to brackets 32 and the piston rods 38 extending from the cylinders 36 are pivotally connected by their respective rearward ends to one of the brackets 30. A vertical post 40 on the forward end of deck 18 is pivotally secured to the outer end of piston rod 42 which extends from cylinder 44, which in turn is pivotally secured to the forward end of tongue 24. A hydraulic power means 46 is mounted on tongue 24 and is series connected in a hydraulic circuit with cylinders 36 and 44. The hydraulic connections between the cylinders have not been shown, but these connections, and the relative displacements of the cylinders are such that the introduction of hydraulic fluid into the circuit in one direction will cause a coordinated displacement of tongue 24 and wheel supporting brackets 30 and 32 whereby the deck 18 is moved vertically while maintained in a horizontal position. The details of this phenomenon are disclosed in the above described co-pending application.

The pallet 48 includes parallel elongated inverted T-shaped members 50 and 52 which are secured at their respective rearward ends to parallel angles 54 and 56, respectively, by means of vertical posts 58. Members 50 and 52 include a horizontal flange 51 and a vertical flange 53. Members 50 and angle 54 dwell in the same vertical plane, and member 52 and angle 56 also dwell in the same vertical plane. The connection between these elements is effected by welding or the like. Bar 60 is welded by its ends to the lower ends of posts 58, and angle 62 is welded by its ends to the upper ends of these posts. An intermediate post 64 is welded by its ends to the centers of bar 60 and angle 62. Struts 66 are secured by their ends to the center of bar 60 and to the upper ends of one of the posts 58. Struts 68 are connected by their ends to bar 60 and one of the members 50 and 52. Parallel planks 70 extend laterally across angles 54 and 56 and are secured thereto by bolts 72 or the like. Planks 70 and angles 54 and 56 comprise the deck portion of the pallet 48.

A U-shaped leg 74 is pivotally connected by its upper ends to angles 54 and 56 by pins 76. Leg 74 includes leg elements 78 which are adapted to engage the horizontal flanges 51 of members 50 and 52 at a point inwardly of vertical flange 53 when the leg elements are in a vertical position. The vertical distance between the members 50 and 52, and the angles 54 and 56 is greater at the rearward end adjacent posts 58 than it is adjacent to leg 74. When in a vertical posiiton, leg 74 is adapted to provide vertical support for angles 54 and 56 by engaging and resting on the flanges 51 of members 50 and 52.

The forward ends of flanges 53 of members 50 and 52 are tapered forwardly and downwardly. Similarly, the vertical flanges 55 of angles 54 and 56 are tapered forwardly and upwardly at their respective forward ends. An elongated roller 80 is rotatably secured by its ends to the vertically disposed flanges 55 of angles 54 and 56, and is adapted for rotation about its longitudinal axis. The extreme lower portion of roller 80 dwells in a plane slightly below the lower edges of flange 55. Roller 80 is positioned by stud shafts 82 at a point forwardly of leg 74 but at a point just rearwardly of the tapered portions on the forward ends of angles 54 and 56. A roller-receiving arcuate notch 84 appears in the lower edge of flange 55 at the rearward ends of each of the angles 54 and 56.

A bracket 86 comprised of a horizontal plate 88 centered on a vertical plate 90 is welded or otherwise secured to the rearward end of deck 18 on trailer 16. Vertical plates 90 are welded to the ends of bracket 86 and have arcuate notch openings 92 and 92 in their upper and lower edges respectively. Elongated roller 94 with stud shafts 96 protruding from the ends thereof is rotatably supported in notches 92 by the engagement of stud shafts 96 with these notches. Similarly, roller 98 has stud shafts 100 protruding from its opposite ends and being rotatably received within notches 93. A keeper bar 102 serves to retain roller 98 in notches 93 and is secured across the bottom of the notch in any convenient fashion. The extreme upper and lower portions of rollers 94 and 98 extend slightly beyond the top and bottom surfaces, respectively, of deck 18. Roller 94 is adapted to be received in notch 84 of pallet 48 at times as will be explained hereafter. The vertical distance between the extreme upper portion of roller 94 and the extreme lower portion of roller 98 is slightly greater than the vertical distance between the lower edge of flange 55 and flange 53 on pallet 48 at a point just forwardly of roller 80.

Figure 2:
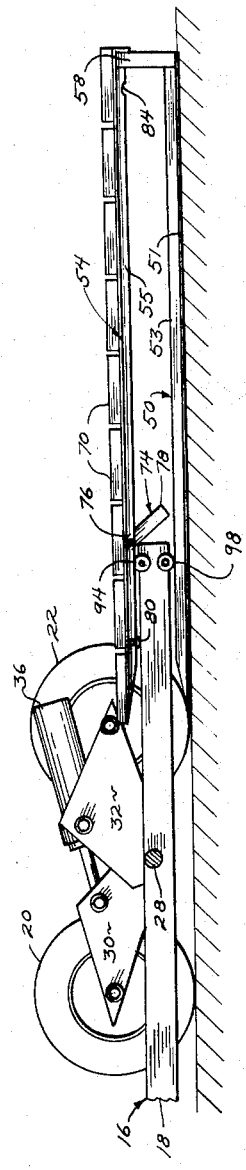
FIGURE 2 is a partial elevational view of my device as it is being mounted on a vehicle of the type shown in FIGURE 1.

The normal operation of my device is as follows: The pallet 48 in either a loaded or unloaded condition can normally be resting on the ground or floor surface as depicted in FIGURE 4. In this condition, leg 74 is in its vertical position and is supporting the forward portions of angles 54 and 56 on the lower flanges 51 of members 50 and 52. The deck 18 of trailer 16 is moved to a lowered position of FIGURE 2 in the manner described, and the rearward end of deck 18 is moved rearwardly into the tapered opening created by the tapered forward ends of members 50 and 52, and angles 54 and 56. The rearward movement of trailer 16 is induced by prime mover 10. The tapered portions on the forward end of the pallet 48 serve as a guide for deck 18 and the rollers 94 and 98 on the rearward end thereof. Since the vertical distance between the extreme upper portion of roller 94 and the extreme lower portion of roller 98 is greater than the vertical distance between the lower edges of flanges 55 and the upper edges of flanges 53 at the forward end of pallet 48, the rollers 94 and 98 tend to forcibly spread the angles 54 and 56 upwardly away from the members 50 and 52. As a consequence, leg 74 is lifted upwardly out of engagement with members 50 and 52, whereupon the forward ends of angles 54 and 56 are then supported by deck 18. Thus, as the rearward end of deck 18 moves rearwardly into the pallet 48 to engage the leg 74, the leg 74 is pivoted upwardly and rearwardly by the rearwardly moving deck. As soon as roller 94 has moved rearwardly of roller 80, the roller 80 on pallet 48 movably engages the flat upper surface of the deck 18. The deck 18 and trailer 16 are moved rearwardly until they assume the approximate position shown in FIGURE 3. At this point, the trailer 16 is actuated in the manner described to elevate deck 18 to the position shown in FIGURE 1. As this is done, roller 94 on the rearward end of deck 18 moves into the notches 84 in the lower edges of flanges 55 at the rearward ends of angles 54 and 56 on pallet 48 to prevent any longitudinal movement between the deck 18 and the pallet while the pallet is entirely supported by the trailer 16. The prime mover 10 can then be used to carry the pallet 48 to any destination and over any route normally accessible to trucks or the like. While in route, the pallet 48 is substantially an integral part of the trailer 16, and the lateral support afforded the pallet by the laterally disposed wheels 20 and 22 affords any load on the pallet the same riding conditions that would be afforded a load directly engaging and resting on the deck 18.

Upon reaching the desired destination, the trailer can be lowered to the position shown in FIGURE 3, whereupon roller 94 will automatically drop out of engagement with the notch 84 in pallet 48. The trailer 16 can then be moved forwardly by prime mover 10 and as it again attains the position shown in FIGURE 2, leg 74 will automatically pivot downwardly to again support the forward end of the pallet 48. The complete withdrawal of the trailer 16 from the pallet 48 will leave the pallet in the condition shown in FIGURE 4.

The foregoing operation permits pallet 48 to be disengaged from its supporting means, picked up by the trailer 16, locked to the trailer, carried to any desired destination, deposited in any desired location, unlocked from engagement with the trailer, and separated from the trailer with its supporting means being re-established, and all of this is achieved without the necessity of any manual operation with regard to either the pallet or the load thereon. Thus, it is seen that my device will accomplish at least all of its stated objectives.

Some changes may be made in the construction and arrangement of my combination pallet and lifting device without departing from the real spirit and purpose of my invention, and it is my intention to cover by my claims, any modified forms of structure or use of mechanical equivalents which may be reasonably included within their scope.

I claim:

1. In a pallet,
   a deck portion having forward and rearward ends,
   a first supporting means on the rearward end of said pallet,
   elongated members extending forwardly from said first supporting means in spaced relation to and underneath said deck portion, and said elongated members being secured to said deck by only said first supporting means,
   an arcuate notch on the lower rearward portion of said deck portion to receive a protrusion on the deck of a lifting device, said protrusion adapted to be separated from said notch upon the application of predetermined longitudinal forces in opposite directions on said pallet deck and said lifting device deck respectively,
   an elongated roller rotatably secured to the lower forward end of said deck portion,
   and a U-shaped leg pivotally secured to the forward end of said deck portion and adapted to engage said elongated members at times to support the forward end of said deck portion.

2. In combination, a self propelled vehicle having forward and rearward ends, a load supporting deck movably secured to the rearward end thereof, wheel elements operatively secured to the lateral sides of said deck, power means including said wheel elements on said vehicle for raising and lowering said deck in a vertical direction at times,
   and a pallet on said deck,
   said pallet including a deck portion detachably resting on top of the said deck of said vehicle,
   a first supporting means on the rearward end of the deck portion of said pallet and extending downwardly below the rearward end of said deck on said vehicle,
   and a second supporting means movably secured to the forward end of said pallet and having an operable position and an inoperable position;
   said second supporting means being held in an inoperative position by said deck on said vehicle whereupon when said deck is lowered to a supporting surface, said first supporting means will engage said supporting surface to provide support for the rearward end of said pallet, and said second supporting means can move to its operative supporting position when said deck of said trailer is withdrawn from underneath the deck portion of said pallet;

an elongated roller extending across the rearward end of the deck on said vehicle and being rotatably secured to the upper portion thereof, and said pallet containing elongated members extending forwardly from said first supporting means underneath the deck on said vehicle and being co-extensive with the deck portion on said pallet.

3. In combination, a self propelled vehicle having forward and rearward ends, a load supporting deck movably secured to the rearward end thereof, wheel elements operatively secured to the lateral sides of said deck, power means including said wheel elements on said vehicle for raising and lowering said deck in a vertical direction at times, and a pallet on said deck, said pallet including a deck portion detachably resting on top of the said deck of said vehicle, a first supporting means on the rearward end of the deck portion of said pallet and extending downwardly below the rearward end of said deck on said vehicle, and a second supporting means movably secured to the forward end of said pallet and having an operable position and an inoperable position;

said second supporting means being held in an inoperable position by said deck on said vehicle whereupon when said deck is lowered to a supporting surface, said first supporting means will engage said supporting surface to provide support for the rearward end of said pallet, and said second supporting means can move to its operative supporting position when said deck of said trailer is withdrawn from underneath the deck portion of said pallet;

an elongated roller extending across the rearward end of the deck on said vehicle and being rotatably secured to the upper portion thereof, and a second roller being similarly disposed across the bottom forward end of said pallet, and said pallet containing elongated members extending forwardly from said first supporting means underneath the deck on said vehicle and being co-extensive with the deck portion on said pallet.

4. In combination, a self propelled vehicle having forward and rearward ends, a load supporting deck movably secured to the rearward end thereof, wheel elements operatively secured to the lateral sides of said deck, power means including said wheel elements on said vehicle for raising and lowering said deck in a vertical direction at times, and a pallet on said deck, said pallet including a deck portion detachably resting on top of the said deck of said vehicle, a first supporting means on the rearward end of the deck portion of said pallet and extending downwardly below the rearward end of said deck on said vehicle, and a second supporting means movably secured to the forward end of said pallet and having an operable position and an inoperable position;

said second supporting means being held in an inoperable position by said deck on said vehicle whereupon when said deck is lowered to a supporting surface, said first supporting means will engage said supporting surface to provide support for the rearward end of said pallet, and said second supporting means can move to its operative supporting position when said deck of said trailer is withdrawn from underneath the deck portion of said pallet;

means for detachably securing said pallet to the deck of said vehicle, and said pallet containing elongated members extending forwardly from said first supporting means underneath the deck on said vehicle and being co-extensive with the deck portion on said pallet.

5. In combination, a self propelled vehicle having forward and rearward ends, a load supporting deck movably secured to the rearward end thereof, wheel elements operatively secured to the lateral sides of said deck, power means including said wheel elements on said vehicle for raising and lowering said deck in a vertical direction at times, and a pallet on said deck, said pallet including a deck portion detachably resting on top of the said deck of said vehicle, a first supporting means on the rearward end of the deck portion of said pallet and extending downwardly below the rearward end of said deck on said vehicle, and a second supporting means movably secured to the forward end of said pallet and having an operable position and an inoperable position;

said second supporting means being held in an inoperable position by said deck on said vehicle whereupon when said deck is lowered to a supporting surface, said first supporting means will engage said supporting surface to provide support for the rearward end of said pallet, and said second supporting means can move to its operative supporting position when said deck of said trailer is withdrawn from underneath the deck portion of said pallet;

said pallet containing elongated members extending forwardly from said first supporting means underneath the deck on said vehicle and being co-extensive with the deck portion on said pallet.

6. In combination, a self propelled vehicle having forward and rearward ends, a load supporting deck movably secured to the rearward end thereof, wheel elements operatively secured to the lateral sides of said deck, power means including said wheel elements on said vehicle for raising and lowering said deck in a vertical direction at times, and a pallet on said deck, said pallet including a deck portion detachably resting on top of the said deck of said vehicle, a first supporting means on the rearward end of the deck portion of said pallet and extending downwardly below the rearward end of said deck on said vehicle, and a second supporting means movably secured to the forward end of said pallet and having an operable position and an inoperable position;

said second supporting means being held in an inoperable position by said deck on said vehicle whereupon when said deck is lowered to a supporting surface, said first supporting means will engage said supporting surface to provide support for the rearward end of said pallet, and said second supporting means can move to its operative supporting position when said deck of said trailer is withdrawn from underneath the deck portion of said pallet;

said pallet containing elongated members extending forwardly from said first supporting means underneath the deck on said vehicle and being co-extensive with the deck portion on said pallet; the forward ends of the deck portion on said pallet and said elongated members being tapered to facilitate the reception therebetween of the deck of said vehicle.

7. In combination, a self propelled vehicle having forward and rearward ends, a load supporting deck movably secured to the rearward end thereof, wheel elements operatively secured to the lateral sides of said deck, power means including said wheel elements on said vehicle for raising and lowering said deck in a vertical direction at times, and a pallet on said deck, said pallet including a deck portion detachably resting on top of the said deck of said vehicle, a first supporting means on the rearward end of the deck portion of said pallet and extending downwardly below the rearward end of said deck on said vehicle, and a second supporting means movably secured to the forward end of said pallet and having an operable position and an inoperable position;

said second supporting means being held in an inoperable position by said deck on said vehicle whereupon when said deck is lowered to a supporting surface, said first supporting means will engage said supporting surface to provide support for the rearward end of said pallet, and said second supporting means can move to its operative supporting position when said deck of said trailer is withdrawn from underneath the deck portion of said pallet, an elongated roller extending across the rearward end of the deck on said vehicle and being rotatably secured to the upper portion thereof and a second elongated roller being similarly mounted to the lower rearward portion of the deck of said vehicle, and said pallet containing elongated members extending forwardly from said first supporting means underneath the deck on said vehicle and being co-extensive with the deck portion on said pallet.

References Cited by the Examiner
UNITED STATES PATENTS

| | | | |
|---|---|---|---|
| 1,921,605 | 8/1933 | Canfield | 214—85 |
| 2,242,436 | 5/1941 | Quayle. | |
| 2,256,453 | 9/1941 | Bomar | 214—621 |
| 2,379,094 | 6/1945 | Maxon | 214—38.46 |
| 2,530,704 | 11/1950 | Kemp | 214—750 |
| 2,534,156 | 12/1950 | Wyatt et al. | 214—517 |
| 2,565,820 | 8/1951 | Machanic | 214—515 X |
| 2,572,348 | 10/1951 | Johnson | 108—51 |
| 2,736,602 | 2/1956 | Ault | 296—35.1 |
| 3,028,023 | 4/1962 | Eckersall | 214—38.10 |
| 3,074,575 | 1/1963 | Tercho | 214—515 |

FOREIGN PATENTS

| | | |
|---|---|---|
| 567,305 | 10/1957 | Italy. |
| 93,476 | 1/1960 | Netherlands. |

HUGO O. SCHULZ, *Primary Examiner.*

GERALD M. FORLENZA, *Examiner.*